(No Model.) 3 Sheets—Sheet 1.
J. A. HOOTON & G. L. WIARD.
COMBINED HAY RAKE AND BALING PRESS.
No. 405,034. Patented June 11, 1889.
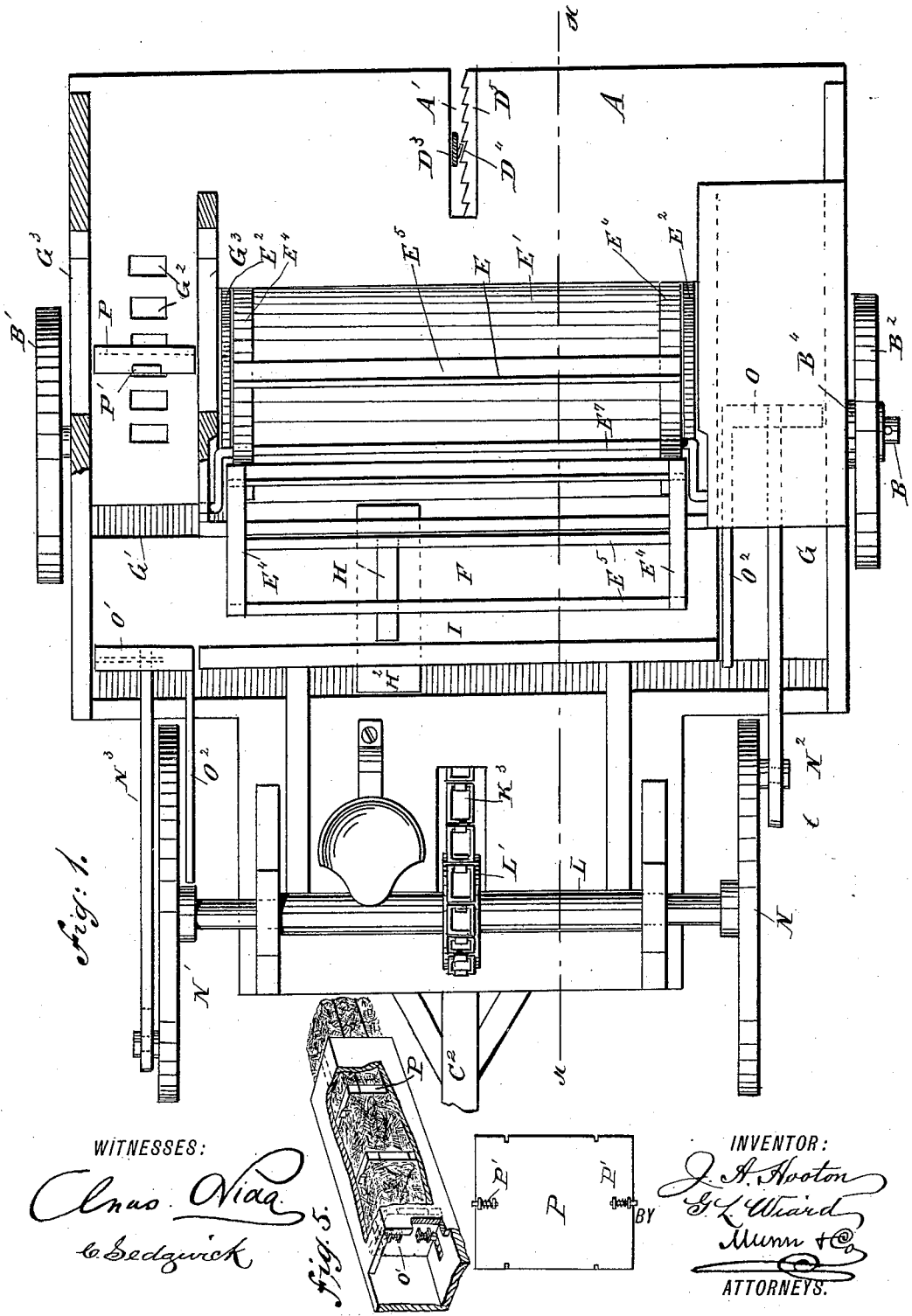
WITNESSES:
INVENTOR:
ATTORNEYS.

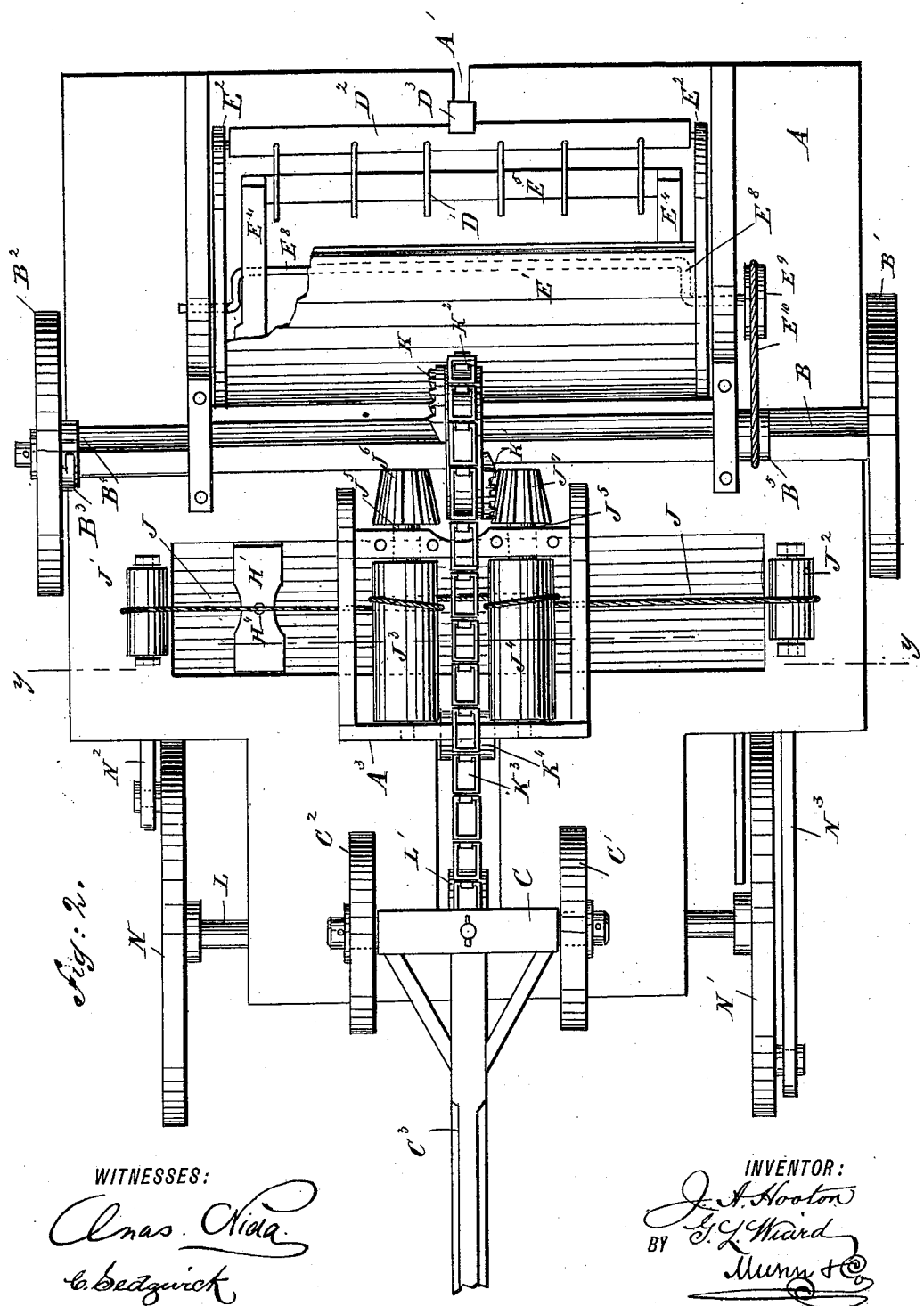

(No Model.) 3 Sheets—Sheet 3.
J. A. HOOTON & G. L. WIARD.
COMBINED HAY RAKE AND BALING PRESS.
No. 405,034. Patented June 11, 1889.
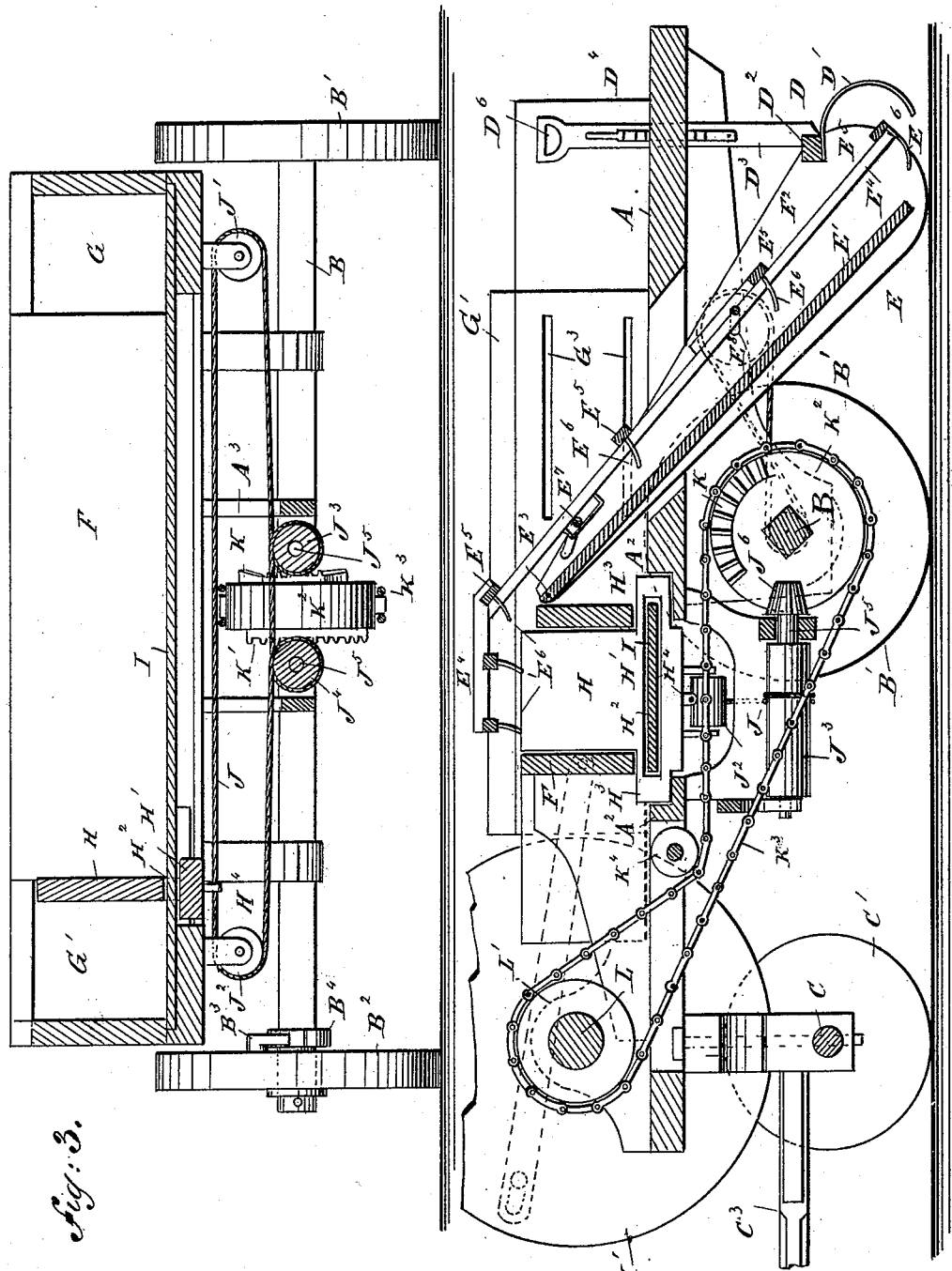
WITNESSES:
Chas. Nida
C. Sedgwick
INVENTOR:
J. A. Hooton
G. L. Wiard
BY
Munn & Co.
ATTORNEYS.

UNITED STATES PATENT OFFICE.

JOHN A. HOOTON AND GILBERT L. WIARD, OF ATKINSON, NEBRASKA, ASSIGNORS TO THEMSELVES AND HARRY W. MATHEWS, OF SAME PLACE.

COMBINED HAY-RAKE AND BALING-PRESS.

SPECIFICATION forming part of Letters Patent No. 405,034, dated June 11, 1889.

Application filed October 22, 1888. Serial No. 288,742. (No model.)

*To all whom it may concern:*

Be it known that we, JOHN A. HOOTON and GILBERT L. WIARD, of Atkinson, in the county of Holt and State of Nebraska, have invented a new and Improved Combined Hay-Rake and Baling-Press, of which the following is a full, clear, and exact description.

The object of the invention is to provide a combined hay-rake and baling-machine which is simple and durable in construction, very effective in operation, taking up the hay from the swath as left by the mowing-machine, baling it, and dropping the finished bales in the field.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of the improvement with one of the baling-boxes in section. Fig. 2 is an inverted plan view of the same. Fig. 3 is a transverse section of the same on the line $y\ y$ of Fig. 2, and Fig. 4 is a longitudinal sectional elevation of the same on the line $x\ x$ of Fig. 1. Fig. 5 is a detail view of one of the baling-boxes and division-plate.

The combined hay-rake and baling-machine is mounted on a suitably-constructed platform A, supported on the axles B and C, the former of which carries the wheels B' and B$^2$ and the latter the wheels C' and C$^2$. The wheel B' is fastened on the axle B, while the wheel B$^2$ is loosely mounted on the same. A pawl B$^3$ is pivoted on the wheel B$^2$ and engages a ratchet-wheel B$^4$ formed on the axle, so that when the operator moves the machine forward movement is imparted from said wheel to the axle B through the said pawl B$^3$ and ratchet B$^4$. On the axle C is secured in the usual manner the tongue C$^3$. At the rear end of the platform A is located the hay-rake D, consisting of the curved prongs D', fastened on the transverse beam D$^2$, mounted to turn and provided at its middle with an upwardly-extending arm D$^3$, passing through a slot A' in the rear end of the platform A. On the arm D$^3$ is held a spring D$^4$, adapted to engage the notched bar D$^5$, held in the slot A', and serving to lock said arm D$^3$ in any desired position. The upper end of the arm D$^3$ is provided with a handle D$^6$, for conveniently moving the arm D$^3$ in order to change the position of the rake D.

The prongs D' operate in conjunction with the lower end of an elevator E, provided with an inclined bottom E', extending upward through a suitable slot in the platform A. The bottom E' is provided with the sides E$^2$, rounded at their lower ends and adapted to rest on the ground. The upper end of the bottom E' is pivoted at E$^3$, so that the elevator is free to swing over rough ground in the field. On the inside of the sides E$^2$ are held the bars E$^4$, connected with each other by the transverse slats E$^5$, in which are secured the downwardly-extending prongs E$^6$, operating over the top of the bottom E'.

The upper ends of the bars E$^4$ extend horizontally over the receiving-box F, arranged transversely on top of the platform A. The bars E$^4$ are connected with a crank-arm E$^7$ and with a crank-arm E$^8$, each having its bearings in the sides E$^2$ and in the frame of the machine. The shaft of the crank-arm E$^8$ carries a pulley E$^9$, connected by a crossed belt E$^{10}$ with a pulley B$^5$, secured on the axle B. Thus when the latter is rotated it imparts a rotary motion to the shaft of the crank-arm E$^8$, so that the latter turns and imparts a swinging motion to the bars E$^4$ and their connections, whereby the prongs E$^6$ take the hay gathered by the prongs D' of the hay-rake and move it onto the bottom E' of the elevator and up the said bottom into the receiving-box F. In the latter is arranged a plunger H, mounted to slide transversely and provided with a bottom H', having a slot H$^2$, fitting over the bottom I of the receiving-box F. The bottom H' of the plunger H is provided with the sidewise-extending lugs H$^3$, mounted to slide in suitable guideways A$^2$, formed in the platform A. On the under side of the bottom H' is secured a lug or eye H$^4$, on which are secured the ends of a rope J, extending in opposite directions and passing over pulleys J' and J$^2$, mounted to turn loosely on the under side of the platform A. The rope J passes from the pulleys J' and J$^2$ over and several times around the wheels J³ and J⁴, mounted to turn in suitable bearings in a bracket A³, held on the under side of the platform A.

On the shafts J⁵ of the wheels J³ and J⁴ are secured bevel gear-wheels J⁶ and J⁷, respectively, of which the bevel gear-wheel J⁶ is adapted to mesh into a segmental bevel gear-wheel K, formed on one face of a sprocket-wheel K², secured on the main axle B. The other bevel gear-wheel J⁷ is adapted to mesh into a bevel gear-wheel K', formed on the other side of the sprocket-wheel K², before mentioned. The segmental gears of the wheels K and K' are located diametrically opposite each other, so that when one engages its respective bevel gear-wheel the other is out of contact with its respective bevel gear-wheel. When the axle B is rotated, the bevel gear-wheels K and K' impart alternately motion to the wheels J³ and J⁴, so that the rope J is moved transversely in both directions, thereby moving the plunger H transversely forward and backward in the receiving-box F.

Over the sprocket-wheel K² passes a sprocket-chain K³, passing under a pulley K⁴, mounted on the under side of the platform A. The sprocket-chain K³ then passes through a slot in the platform A and over a sprocket-wheel L', secured on a shaft L, mounted to rotate in suitable bearings on top of the platform A. On the ends of the shaft L are secured the crank-wheels N and N', connected with the pitmen N² and N³, secured to the plungers O and O', respectively, mounted to slide in the baling-boxes G and G', held at the ends of the receiving-box F and extending longitudinally on top of the platform A. The pitmen N² and N³ are slotted at their outer ends, and through the respective slots pass the crank-pins of the crank-wheels N N', so as to give the plungers O and O' a free movement in their respective baling-boxes G and G'. Each of the plungers O and O' is provided with a vertical plate O², adapted to close the respective end of the receiving-box F when the plunger moves inward to compress the hay, as is plainly shown in Fig. 1.

Inside of each baling-box G G' is held an adjustable follower P, provided on the top and bottom with a spring-actuated bolt P', adapted to engage corresponding notches G², formed in the top and bottom of the said baling-boxes G and G'.

The baling-boxes G and G' are provided in their sides with the usual slots G³ for the passage of the wire or baling-band to be passed around the compressed bale.

The operation is as follows: When the machine is moved forward, the main driving-wheel B² imparts a rotary motion to the axle B, and the latter, by its pulley B⁵, operates the rake of the elevator E, as before described. At the same time the axle B causes the plunger H to slide transversely alternately in each direction in the receiving-box F. The crank-disks N and N', operated from the main axle B, impart a forward and backward sliding motion to the plungers O and O', traveling in the baling-boxes G and G', respectively. The swath left by the mowing-machine is taken up by the prongs D' of the rake D, and the lower prongs E⁶ on the transverse bars E⁵ of the elevator E take hold of the gathered hay and move the same onto the inclined bottom E' of the elevator. The upward movement of the bars E⁴, carrying the prongs E⁶, shoves the hay upward on the said bottom E', and finally deposits it in the receiving-box F. The plunger H is then at one end of the receiving-box, and when sufficient hay has accumulated in the latter the respective gear-wheel K or K' commences to operate on the respective gear-wheel J⁶ or J⁷, so that the plunger moves toward the other end of the receiving-box F, thereby moving the accumulated hay into the respective baling-box G or G' at the time when its plunger O or O', respectively, is in its outermost position, as is shown at the right side of the machine in Fig. 1. The cogs of the segmental gear-wheels K and K' do not cover half of the circumference of the wheel K², so as to leave a space between the ends of the segmental gear-wheels K and K', thereby permitting the plungers H to remain at the end of the respective box until the respective plunger O or O' has closed, by its plate O², the end of the receiving-box F. The crank-wheel N' or N then pushes its plunger O rearwardly, whereby the hay is pressed rearwardly in the respective baling-box G or G', and at the same time the plate O² of the respective plunger O or O' closes the corresponding end of the receiving-box F. The notches G² are preferably in the form of inclined teeth formed on rack-bars, as shown in Fig. 5, and the teeth incline toward the delivery end of the baling-boxes. The bolts on the followers are also inclined or beveled, so that they will engage the rack-bars and prevent the expansion of the hay toward the feed or inlet end of the baling-chamber. In practice each baling-box is about eight and a half feet in length. When the plungers have forced a sufficient quantity of hay for a bale into a box, a follower P is inserted in front of the hay, with its bolts in engagement with said racks, and the hay is therefore prevented from expanding toward the inlet end of the box, and the bands are tied around it in the usual manner. In the meantime the hay for the next bale will be accumulating and the first bale and the follower will be slowly forced toward the delivery end of the box. When sufficient hay for the second bale shall have been forced into the box, a follower P is placed in front of it and the third bale begins to accumulate, and so on. The bales will be about three feet long, and therefore when part of the third bale has been partially formed in the same box the first bale will begin to leave the box, and this bale is followed by the first follower, and so on. The same steps will be repeated by the other baling mechanism, and the bales will be alternately and continuously discharged from the two boxes. The followers P serve not only to divide the bales, but take the place of the inward-projecting catches ordinarily used to prevent backward expansion of the hay. Thus it will be seen that the machine can be kept in continuous motion as the accumulated hay is alternately discharged into one or the other baling-box to be baled. The prongs D' of the rake D can be moved in any desired position nearer to or farther from the ground by moving the arm $D^6$ forward or backward and locking the said arm in place by the spring $D^4$. It is understood that the transverse bar $D^2$ is pivoted in the sides $E^2$ of the elevator E.

Having thus fully described our invention, we claim as new and desire to secure by Letters Patent—

1. The combination, with the parallel baling-boxes having a common receiving-box at right angles thereto, of the alternately-operating plungers in said baling-boxes, the reciprocating plunger in said receiving-box having two working-faces, and an operating mechanism outside of the receiving-box connected with said plunger therein, substantially as set forth.

2. A combined hay-rake and double baling-press comprising the hay-rake, the elevator, the longitudinally-extending baling-boxes, their alternately-operating plungers, and a feeder delivering alternately into said baling-boxes, substantially as set forth.

3. The combination, with a hay-rake and an elevator, of a transverse receiving-box into which the said elevator discharges, a plunger operating in the said receiving-box, a baling-box located at each end of the said receiving-box, and plungers operating in the said baling-boxes, substantially as shown and described.

4. The combination, with a hay-rake and an elevator, of a transverse receiving-box into which said elevator discharges, a plunger operating in the said receiving-box, a baling-box located at each end of the said receiving-box, plungers operating in the said baling-boxes, and followers held adjustably in the said baling-boxes, substantially as shown and described.

5. The combination, with a platform and a main driving-axle having a rotary motion, of a hay-rake held adjustably on the rear end of the said platform, an elevator receiving its motion from the said main axle and fed by the said hay-rake, a receiving-box held transversely on the upper end of the said elevator, a plunger moving transversely in the said receiving-box, deriving its motion from the said main axle, baling-boxes located at the ends of the said receiving-box, a follower held adjustably in each of the said baling-boxes, and plungers moving in the said baling-boxes and deriving their motion from the said main axle, substantially as shown and described.

6. The combination, with a platform and a main axle, of a receiving-box located transversely on the said platform, a plunger mounted to slide in the said receiving-box, a rope connected by its ends to the said plunger, wheels around which the said rope is wound, beveled gear-wheels held on the said wheels, and segmental gear-wheels held on the said main axle and adapted to engage the said bevel gear-wheels alternately, substantially as shown and described.

7. The combination, with a platform and a main axle, of two baling-boxes located longitudinally on the said platform, plungers operating alternately in the same direction in the said baling-boxes, pitmen pivotally connected with the said plungers, crank-disks pivotally connected with the said pitmen, a shaft carrying the said crank-disks and deriving a rotary motion from the said main axle, a receiving-box mounted transversely on the said platform and discharging at its ends into the said baling-boxes, and a plunger held to slide in the said receiving-box and operated from the said main axle, substantially as shown and described.

8. The combination, with a platform and a main axle, of two baling-boxes located longitudinally on the said platform, plungers operating alternately in the same direction in the said baling-boxes, pitmen pivotally connected with the said plungers, crank-disks pivotally connected with the said pitmen, a shaft carrying the said crank-disks and deriving a rotary motion from the said main axle, a receiving-box mounted transversely on the said platform and discharging at its ends into the said baling-boxes, a plunger held to slide in the said receiving-box and operated from the said main axle, and adjustable followers held in the said baling-box, substantially as shown and described.

9. A combined raking and baling machine consisting of a supporting-frame mounted on drive-wheels, a hay-rake, an elevator receiving the hay from said rake, a receiving-box into which said elevator discharges, a plunger reciprocating in said box, a baling-box, a plunger reciprocating in said baling-box, and operating mechanism, substantially as set forth.

JOHN A. HOOTON.
GILBERT L. WIARD.

Witnesses:
J. W. BARGER,
JAS. P. FLEMING.